United States Patent [19]
Weinshenker et al.

[11] 3,920,827
[45] Nov. 18, 1975

[54] PHARMACEUTICAL COMPOSITIONS CONTAINING THERAPEUTIC 5′,6′-DIHYDRO-2H-PYRAN-4′-YLOXY PROSTAGLANDINS

[75] Inventors: Ned M. Weinshenker, Sunnyvale, Calif.; Niels H. Andersen, Seattle, Wash.

[73] Assignee: ALZA Corporation, Palo Alto, Calif.

[22] Filed: Aug. 9, 1974

[21] Appl. No.: 496,427

Related U.S. Application Data

[62] Division of Ser. No. 156,510, June 24, 1971, Pat. No. 3,853,854.

[52] U.S. Cl. .............................................. 424/283
[51] Int. Cl.² ........................................ A61K 31/35
[58] Field of Search .................................. 424/283

[56] References Cited
UNITED STATES PATENTS
3,801,623  4/1974  Martel et al. ..................... 424/283
3,867,375  2/1975  Alvarez et al. .................... 424/283

Primary Examiner—Sam Rosen
Attorney, Agent, or Firm—Paul L. Sabatine; Edward L. Mandell; Steven D. Goldby

[57] ABSTRACT

Novel 5′,6′-dihydro-2H-pyran-4′-yl prostaglandin ether compounds of the formula

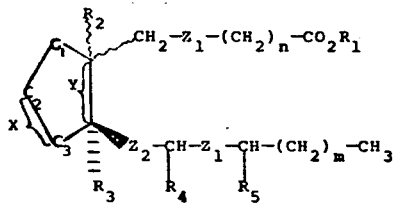

wherein $R_1$ is hydrogen or lower alkyl; $R_2$ and $R_3$ are hydrogen when Y is a single bond and $R_2$ and $R_3$ are absent when Y is a double bond; $R_4$ is

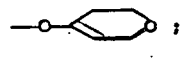

$R_5$ is hydrogen or

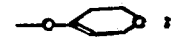

$C_1$ is >C=O,

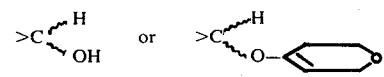

$C_2$ is >C—H when X is a double bond; and $C_2$ is

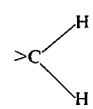

when X is a single bond;

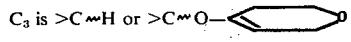

when X is a double bond and

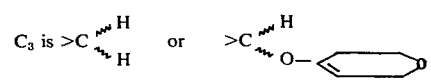

when X is a single bond; $Z_1$ is a cis or trans —CH=CH— or —CH₂CH₂—; $Z_2$ is trans —CH=CH— or —CH₂CH₂—; $n$ is 1 to 5; $m$ is 0 to 5; and the non-toxic salts. The novel compounds possess pharmacological properties as modifiers of smooth muscle activity, gastric secretion, blood pressure, lipolysis and the reproductive system. The compounds also induce labor and menses and they can be used for the relief of asthma and nasal congestion and as platelet anti-aggregation agents.

2 Claims, No Drawings

PHARMACEUTICAL COMPOSITIONS CONTAINING THERAPEUTIC 5',6'-DIHYDRO-2H-PYRAN-4'-YLOXY PROSTAGLANDINS

CROSS-REFERENCE TO RELATED APPLICATION

This application is a division of application Ser. No. 156,510, filed on June 24, 1971 now U.S. Pat. No. 3,853,854.

DESCRIPTION OF NOVEL COMPOUNDS

This invention relates to both novel and useful 5',6'-dihydro-2H-pyran-4'-yl prostaglandin ethers as represented by Formula 1:

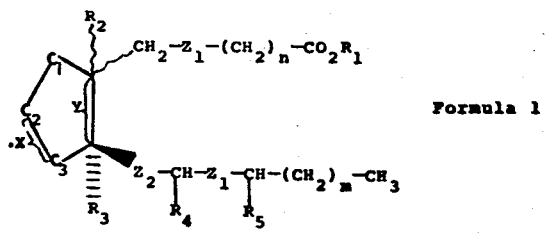

Formula 1 wherein $R_1$ is a member selected from the group consisting of hydrogen and lower alkyl; $R_2$ and $R_3$ are both hydrogen when Y is a single carbon carbon bond and $R_2$ and $R_3$ are both absent when Y is a double bond; $R_4$ is

$R_5$ is a member selected from the group consisting of hydrogen and

$C_1$ is a member selected from the group consisting of $>C=O$,

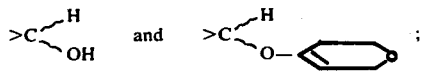

$C_2$ is $>C-H$ when X is a double bond and $C_2$ is

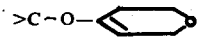

when X is a single bond; $C_3$ is a member selected from the group consisting of $>CH$ and

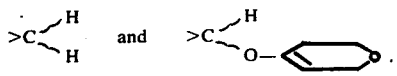

when X is a double bond and $C_3$ is a member selected from the group

when X is a single bond; $Z_1$ is a member selected from the group consisting of cis and trans $-CH=CH-$ and saturated $-CH_2CH_2-$; $Z_2$ is a member selected from the group consisting of trans $-CH=CH-$ and saturated $-CH_2CH_2-$; X is a member selected from the group consisting of single and double bonds with the proviso as set forth for $C_2$ and $C_3$ above; Y is a member selected from the group consisting of single and double bonds with the proviso as set forth for $R_2$ and $R_3$ above; n is 1 to 5 and m is 0 to 5; and the non-toxic salts thereof.

The term lower alkyl appearing above and elsewhere in the present specification denotes a straight or branched chain alkyl group of 1 to 8 carbon atoms inclusive, such as, methyl, ethyl, n-propyl isopropyl, n-butyl, tert-butyl, n-pentyl, neopentyl, n-hexyl, isohexyl, n-octyl, heptyl, and the like.

The pharmaceutically acceptable, non-toxic salts of the novel 5',6'-dihydro-2H-pyran-4'-yl prostaglandin ethers of Formula 1 ($R_1=H$) can also be used and they include the non-toxic alkali metal and the non-toxic alkaline earth metal bases such as sodium, potassium, calcium, copper, and magnesium, the hydroxides and carbonates thereof, and the ammonium salts and substituted ammonium salts, for example, the non-toxic salts of trialkylamines such as trimethylamine, triethylamine and triisopropylamine, and other organic amines such as morpholine, diethylamine, dimethylamine, methyl cyclohexylamine, glucosamine, procaine, dibenzylamine, triethanolamine, N-benzyl-$\beta$-phenylethylamine, ethyldimethylamine, benzylamine, N-(lower)alkyl piperdines such as N-ethylpiperdine, N-methylpiperdine and other pharmaceutically acceptable amines. Also non-toxic salts with monoalkyl- and dialkylamines, and salts formed from compounds of Formula 1 ($R_1=H$) and tetraalkylammonium hydroxides. The latter are generally called therapeutically acceptable quaternary ammonium salts, for example, tetramethylammonium, tetrapropylammonium, tetraethylammonium, phenyltriethylammonium, benzyltri-isopropylammonium salts, and the like.

DESCRIPTION OF INVENTIVE EMBODIMENTS

The stereochemistry used for the prostaglandin compounds of the invention is the art accepted stereochemistry. That is, the stereochemistry of the substituents bonded to the carbon of the 5-membered cyclopentane ring may be $\alpha$-oriented or $\beta$-oriented as indicated by a wavy line. The dashed line indicates an $\alpha$-orientation and the solid wedged line indicates a $\beta$-orientation. Alpha-substitutents are oriented on the opposite side of the cyclopentane ring as the $\omega$-terminal chain and $\beta$-substituents are oriented in the opposite sense, that is, on the same side as the alkyl side chain. The substituents attached to the alkyl side chain may have a sinister (S) or rectus (R) configuration, which for the projection of these compounds shown, is the equivalent nomenclature of $\alpha$ and $\beta$ respectively. The 5',6'-dihydro-2H-pyran-4-yl prostaglandin ethers depicted by Formula 1 and elsewhere in the specification and the accompanying claims includes the analogues and all the diastereomers thereof, and in addition the enantiomeric forms and such mixtures as are designated racemates. The stereochemistry nomenclature and in addition the numbering system employed herein is disclosed in *Progress In The Chemistry of Fats And Other Lipids*, Vol IX, Part 2, pages 233 to 273, 1968, Pergamon Press, New York; and *J. Lipids Research*, Vol 10, pages 316 to 319, 1969.

The novel 5',6'-dihydro-2H-pyran-4'-yl prostaglandin ethers of the invention as represented by Formula 1 supra, and throughout the specification and the accompanying claims, are prepared from the corresponding prostaglandin compounds (natural or synthetic) or prostaglandin intermediate compounds by separately converting them to the appropriate prostaglandin ether compound of the invention by chemical means. The corresponding starting prostaglandin can be represented by Formula 2:

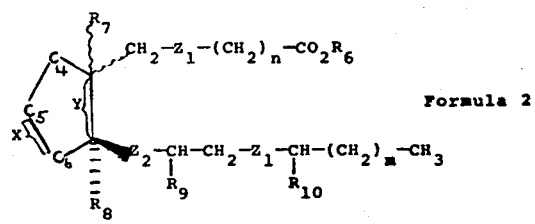

Formula 2 wherein $R_6$ is hydrogen, $R_7$ and $R_8$ are both hydrogen when Y is a single bond and $R_7$ and $R_8$ are absent when Y is a double bond; $R_9$ is hydroxyl; $R_{10}$ is hydrogen or hydroxyl; $C_4$ is $>C=O$ or

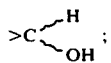

$C_5$ is hydrogen or

$C_6$ is hydrogen,

or

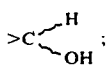

$Z_1$ is a cis or trans —CH=CH— group or a saturated —$CH_2CH_2$— group; $Z_2$ is a trans —CH=CH— group or a —$CH_2CH_2$— group; X is a single bond when $C_5$ is

and $C_6$ is

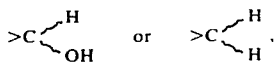

and X is a double bond when $C_5$ and $C_6$ are $>C$—H;

Y is a single or double bond as defined above; $n$ is 1 to 5 and $m$ is 0 to 5. The prostaglandin intermediate type compounds that are suitable for the present purpose are represented by Formula 3

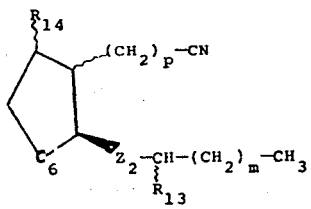

Formula 3 wherein $R_{14}$ is an NHCHO, NHCOCH$_3$, NHCO-alkyl or NH$_2$ group, $C_6$, $Z_2$, $R_3$ and $m$ are as previously defined, $p$ is 4 to 7, and the enantiomeric forms.

The starting materials of Formula 2 used herein to synthesize the compounds of Formula 1 are prepared in art known ways or they are readily obtained from commercial sources. The starting materials of Formula 2 are prepared by isolating the prostaglandin from natural sources, for example, the vesicular glands of sheep, or by the enzymatic conversion from fatty acid substrates such as arachidonic acid, and depending on the substituents desired, routinely chemically transforming double bonds to single bonds by hydrogenation, converting keto groups to hydroxymethylene groups by reduction, by dehydrating to introduce double bonds, by forming carbinol derivatives by treating carbo(lower) alkoxy groups with an alkali metal alumino hydride reducing agent such as lithium aluminum hydride and the like. Specific prior art methods that set forth the procedures useful for providing all of the natural and naturally derived starting compounds embraced by Formula 2 are found in *Science*, Vol 158, pages 382 to 391, 1967; *Recueil*, Vol 85, pages 1233 to 1250, 1966; *Biochem. Biophys. Acta.*, Vol 106, pages 215 to 217, 1965; *Agnew. Chem. Inter. Ed.*, Vol 4, pages 410 to 416, 1965; *Experientia*, Vol 21, pages 113 to 176, 1965; *Recueil*, Vol 85, pages 1251 to 1253, 1966; and in other art recorded procedures.

The starting prostaglandin compounds and the starting materials depicted by Formulas 2 and 3 can also be chemically prepared by well-known methods, for example, from a common synthetic intermediate, 11,15-bis(tetrahydropyranyl)ether of 9α,11α,15(S)-trihydroxy-5-cis,13-trans-prostadienoic acid, to give the resulting prostaglandins as reported in *J. Am. Chem. Soc.*, Vol 92, pages 2586 to 2587, 1970, and references therein; as prepared by the reduction of 2-oxa-3-oxa-6-exo-(trans-3-(S)-hydroxy-hept-1-enyl)-endo-7-acetoxy-cis-bicyclo [3.3.0] octane followed by reduction and treatment with Wittig reagent to give the corresponding prostaglandins as set forth in *J. Am. Chem. Soc.*, Vol 91, pages 5675 to 5677, 1969; by the total synthesis of prostaglandins via a tricarbocyclic intermediate as reported in *Tetrahedron Letters*, Vol 4, pages 307 to 310, 1970; by the total synthesis from 2-oxabicyclo[3.3.0]oct-6-en-3-one, ibid, pages 310 to 311, 1970; and other reported chemical synthesis embracing prostaglandins within Formula 2 such as the *J. Am. Chem. Soc.*, Vol 90, pages 3245 to 3247, 1968; ibid, Vol 91, pages 535 to 536, 1969; ibid, Vol 92, pages 397 to 398, 1970; and in *The Proceedings of the Robert A. Welch Foundation Conference on Chemical Research*, Vol XII, pages 51 to 79, 1969. The prostaglandin starting materials embraced by Formula 3 are known to the art by the chemical synthetic route described in *J. Am. Chem. Soc.*, Vol 90, pages 3245 to 3247, 1968; and ibid, Vol 91, pages 535 to 536 (1969).

The 5',6'-dihydro-2H-pyran reactants used to form the prostaglandin ethers can be synthesized by well-known procedures. For example, tetrahydro-4-pyrone can be reacted with a lower alkanol under acidic conditions to form the intermediate 4',4'-di(lower)alkoxytetrahydropyran, which upon distillation with an acid such as p-toluenesulfonic acid or mesitylenesulfonic acid yields the 4'-lower alkoxy-5',6'-dihydro-2H-pyran product. The lower alkanols used include, for example, methanol, ethanol, n-propanol, isopropanol, n-butanol, isobutanol, pentanol, amyl alcohol, hexanol and the like, to form the corresponding pyran. The reaction of the 4'-lower alkoxy-5',6'-dihydro-2H-pyran with the starting materials of Formulae 2 and 3 to give the desired 5',6'-dihydro-2H-pyran ether of prostaglandin of the invention also produces small amounts of 4'-lower alkoxy-tetrahydropyran-4'-yl ethers of prostaglandin. To obtain increased quantities of 5',6'-dihydro-2H-pyran ether of prostaglandin, higher amounts of the acid catalysts and longer reaction times are used to lead to increased yields of 5',6'-dihydro-2H-pyran-4'-yl ethers of prostaglandins. The formed products can also be separated by conventional chromatographic techniques using synthetic magnesium silicate, silica gel, routine exchange resins, alumina and the like. The methods just described are reported in *J. Am. Chem. Soc.*, Vol 89, pages 3366 to 3368, 1967, and in *Tetrahedron*, Vol 26, pages 1023 to 1030, 1970.

The 5',6'-dihydro-2H-pyran group is introduced onto the prostaglandin starting materials of Formulae 2 and 3 by intimately contacting and reacting the prostaglandin's free hydroxyl group under anhydrous conditions with an excess of 5',6'-dihydro-2H-pyran. The hydroxy-prostaglandins are reacted, for example, with from about 1 to about 25 or more molecular equivalents of the pyran under anhydrous conditions, in the presence of an inert organic solvent and in the presence of small amounts of acid catalysts. The reaction is usually carried out at a temperature of 0°C to 75°C, usually at room temperature, about 25°C, for about 30 minutes to 96 hours, to produce from the starting reactants and intermediates compounds that can be converted to the corresponding compound of Formula 1.

Exemplary of suitable inert, organic solvents for performing the reaction generally include halogenated solvents such as methylenechloride, chloroform, carbon tetrachloride and ethylene chloride, and other solvents such as tetrahydrofuran, dimethoxyethane, dimethylformamide, dimethylsulfoxide, dioxane, isobutyl ketone, cyclopentane, cyclooctane, n-hexane, n-heptane, mixtures therof and the like.

Representative of acid catalyts suitable for performing the reactions are p-toluenesulfonic acid, hydrochloric acid, anhydrous hydrobromic acid, Lewis acids such as boron trifluoride, boron trichloride etherate, stannic oxychloride, phosphorus oxychloride, phosphorus pentachloride, zinc chloride, mixtures thereof, and the like.

The 5',6'-dihydro-2H-pyran-4'-yloxy prostaglandins ($R_1$=H) can be converted to its non-toxic, pharmaceutically acceptable salt by neutralizing the prostaglandin with an equivalent or an excess amount of the corresponding non-toxic salt forming organic or inorganic base. The salts are prepared by procedures known to the art, for example, equivalent or stoichiometric quantities of the prostaglandin and the organic base are dissolved in an inert organic solvent at room temperature or in a warmed solvent with a gentle mixing of the reacting prostaglandin and the base until all the reactants are in solution. The product or salt is obtained by chilling the resulting mixture to precipitate the powder or crystals, or the product can be isolated by the addition of a miscible diluent of low polarity, or by the use of standard evaporation techniques. The formation of inorganic pyran-prostaglandin salts is also carried out by procedures known to the art; for example, the prostaglandin is dissolved in an aqueous solution containing stoichiometric amounts or an excess amount of a non-toxic base forming inorganic sodium, calcium and potassium salts, or the like. This reaction can be carried out in the presence of an inert organic solvent, and the product is obtained by procedures such as the evaporation of the aqueous medium, or the organic medium, by the addition of miscible solvents of low polarity, or by chilling the mixture to precipitate the product.

The lower alkyl esters of the compounds are obtained by art known procedures, such as, the treatment of the prostaglandin acid with a solution containing diazo(lower)alkanes to produce the prostaglandin ester. Esterification of the prostaglandin acid is performed by reacting the acid with the diazoalkane, for example, diazomethane, diazoethane, diazopropane, diazobutane, etc., in an inert organic solvent, for example, lower alkanols, symmetrical and unsymmetrical ethers, halogenated solvents. Examples of solvents are ethanol, methanol, diethyl ether, methylethyl ether, tetrahydrofuran, chloroform, etc., or with mixtures thereof. The esterification reaction is performed at a temperature of 0°C to 25°C, usually at room temperature and atmospheric pressure, with the ester recovered by evaporation of the solvent and like chemical techniques. The esterification reaction is described in *Organic Chemistry*, by Fieser and Fieser, pages 180 to 181, 1944.

The following preparations are set forth as representative methods illustrative of the spirit of the present invention. These preparations are not to be construed as limiting the scope of the invention as other functionally equivalent means will be readily apparent to those skilled in the subject art.

EXAMPLE 1

Synthesis of 11,15-bis(5',6'-dihydro-2H-pyran-4'-yloxy)-5-cis,13-trans-prostadienoic, (11,15-bis-dihydro-pyran of $PGF_{2\alpha}$). Finely powdered 5-triphenylphosphonio pentanoic acid (1.20 mmol) is heated to 75°C in vacuo for 1 hour and it is then placed under an argon atmosphere. Next, dry dimethyl sulfoxide, about 0.8 ml, is added to dissolve the warm solid and the resulting solution is cooled to ambient temperature. Then, about 2.30 mmol, of 2 M sodio methylsulfinylcarbanide, in dimethyl sulfoxide, is added with constant stirring. Then, crude hemiacetal, Formula 4,

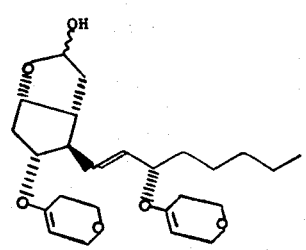

Formula 4 in 0.5 ml of dry dimethyl sulfoxide is added after about 5 minutes. The mixture is stirred at ambient temperature for 1.0 hr, and the dimethyl sulfoxide is removed under reduced pressure, about 0.1 mm, and the residue is diluted with distilled water. The pH of the aqueous phase is adjusted to 9–10 with solid potassium carbonate. Then, the neutral components are extracted with ethyl acetate:ether (1:1) and then the aqueous phase is acidified with oxalic acid to pH about 3. Extraction with 1:1 pentane:ether is followed by washing the extracts with saturated brine and then drying over anhydrous magnesium sulfate, to yield the desired 11,15-bis-dihydro-pyran of $PGF_{2\alpha}$.

EXAMPLE 2

Synthesis of 11,15-bis(5',6'-dihydro-2H-pyran-4'-yloxy)-9-oxo-5-cis,13-trans-prostadienoic acid,(11,15-bis-dihydropyran of $PGE_2$). A mixture of the crude 11,15-dihydro-pyran of $PGF_{2\alpha}$ ), (as synthesized in Example 1), about 70 mg and 1.40 ml of acetone is cooled to −10°C. Then, 59.0 µl of Jones' Reagent is added over 5 minutes with constant stirring. After an additional 25 minutes at −10°C, 59µl of isopropyl alcohol is added and after 5 minutes the mixture is diluted with 10 ml of ethyl acetate. The organic phase is separated, washed with water and saturated brine, dried over anhydrous magnesium sulfate to yield 11,15-bis-dihydro-pyran of $PGE_2$.

EXAMPLE 3

Synthesis of 11,15-bis(5',6'-dihydro-2H-pyran-4'-yloxy)-13-trans-prostenoic acid,(11,15-bis-dihydro-pyran of $PGF_{1\alpha}$). A mixture of 0.08 mmol of 11,15-bis-dihydro-pyran of $PGF_{2\alpha}$, as prepared according to Example 1, and 9.6 mg of 5% Pd/C in 5.0 ml of dry methanol is hydrogenated at −15°C to −20°C at atmospheric pressure. After 3 hrs the mixture is filtered through Celite 545 and concentrated in vacuo to give the product, also containing small amounts of 13,14-dihydro-bis-(dihydro-pyran) of $PGF_{1\alpha}$.

EXAMPLE 4

Synthesis of 11,15-bis(5',6'-dihydro-2H-pyran-4'-yloxy)-9-oxo-13-trans-prostenoic acid,(11,15-bis-dihydro-pyran of $PGE_1$). To a solution, cooled to about −10°C of the compound prepared in Example 3 in 1.5 ml of acetone is added 59.5 µl of Jones' Reagent. After stirring for 5 minutes at −10°C, 59.5 µl of isopropyl alcohol is added and stirring is continued for 5 minutes at −10°C. Then, after dilution with ethyl acetate, the organic phase is washed with distilled water and saturated brine, dried over anhydrous magnesium sulfate and concentrated to yield the product.

EXAMPLE 5

To a mixture of 0.5 g of 9α,11α,15(S)-trihydroxy-13-transprostenoic acid and 10 cc of dry benzene there is added 2 cc of 4'-methoxy-5',6'-dihydro-2H-pyran and about 5 ml of the mixture and dihydropyran is distilled off to remove moisture, then, the remaining mixture is cooled to room temperature. To the cooled mixture is then added 0.03 g of p-toluenesulfonic acid and the resulting mixture is allowed to stand at room temperature for about 50 hours. Following this reaction period, the reaction mixture is diluted with 10 ml of ethyl acetate, washed with an aqueous 5% sodium carbonate solution and then with distilled water until an essentially neutral pH is obtained for the mixture. Finally, the neutral organic phase is dried over anhydrous sodium sulfate and evaporated to dryness. The dry residue is then chromatographed by passing it, dissolved in hexane, (containing a little ethyl acetate) through a column of neutral silica to yield 9α,11α,15(S)-tris(5',6'-dihydro-2H-pyran-4'-yloxy)-13-trans-prostenoic acid.

EXAMPLE 6

Repeating the procedure of Example 5 but replacing 9α,11α,15(S)-trihydroxy-13-trans-prostenoic acid with:
  9β,11α,15(S)-trihydroxy-13-trans-prostenoic acid,
  9α,11α,15(S)-trihydroxy-5-cis,—-trans-prostadienoic acid,
  9β,11α,15(S)-trihydroxy-5-cis,13-trans-prostadienoic acid,
  9β,11β,15(R)-trihydroxy-13-trans-prostenoic acid, and,
  9α,11α,15(S)-trihydroxy-5-cis,13-trans,17-cis-prostatrienoic acid, the following novel prostaglandin ethers are formed:
  9β,11α,15(S)-tris(5',6'-dihydro-2H-pyran-4'-yloxy)-13-transprostenoic acid,
  9β,11α,15(S)-tris(5',6'-dihydro-2H-pyran-4'-yloxy)-5-cis,13-trans-prostadienoic acid,
  9β,11β,15(R)-tris(5',6'-dihydro-2H-pyran-4'-yloxy)-13-transprostenoic acid,
  racemic 9β,11β,15(R)-tris(5',6'-dihydro-2H-pyran-4'-yloxy)-5-cis,13-trans-prostadienoic acid,
  9α,11α,15(S)-tris(5',6'-dihydro-2H-pyran-4'-yloxy)-5-cis,13-trans-prostadienoic acid, and,
  9α,11α,15(S)-tris(5',6'-dihydro-2H-pyran-4'-yloxy)-5-cis,13-trans,-17-cis-prostatrienoic acid.

EXAMPLE 7

To a solution of 500 mg of 15(S)-hydroxy-9-oxo-10,13-transprostadienoic acid and 20 ml of methylene chloride at 25°C there is added an excess, 1.5 ml of freshly prepared 4'-methoxy-5',6'-dihydro-2H-pyran and 40 mg of anhydrous p-toluenesulfonic acid catalyst, and the mixture is gently stirred for about 15 to 20 minutes. Next, the reaction mixture is quenched by adding about 5 to 6 drops of pyridine and it is diluted with about 50 ml of ether. Then, the mixture is washed with 10 ml aliquots of 50% brine and with 10 ml of saturated brine. Finally, the extracted organic phase is dried over anhydrous magnesium sulfate and concentrated under house vacuum to dryness. The dry residue is then chromatographed by passing it, dissolved in hexane containing a little ethyl acetate, through a column of neutral alumina, to give 15(S)-(5',6'-dihydro-2H-pyran-4'-yloxy)-9-oxo-10,13-trans-prostadienoic acid.

EXAMPLE 8

Repeating the procedure of Example 7 but substituting for 15(S)-hydroxy-9-oxo-10,13-trans-prostadienoic acid the following:
  15(S)-hydroxy-9-oxo-5-cis,10,13-trans-prostatrienoic acid,
  15(R)-hydroxy-9-oxo-10,13-trans-prostadienoic acid,
  15(R)-hydroxy-9-oxo-5-cis,10,13-trans-prostatrienoic acid, and,
  15(S),19-dihydroxy-9-oxo-10,13-trans-prostadienoic, the following novel ethers are formed:
  15(S)-(5',6'-dihydro-2H-pyran-4'-yloxy)-9-oxo-5-cis,10,13-trans-prostatrienoic acid, 15(R)-(5',6'-dihydro-2H-pyran-4'-yloxy)-9-oxo-10,13-trans-prostadienoic acid, 15(R)-(5',6'-dihydro-2H-pyran-4'-yloxy)-9-oxo-5-cis,10,13-trans-prostatrienoic acid, and, 15(S),19-bis(5',6'-dihydro-2H-pyran-4'-yloxy)-9-oxo-10,13-trans-prostadienoic acid.

EXAMPLE 8

To a 500 ml roundbottom borosilicate flask containing 0.4 g of methyl-15(S)-hydroxy-9-oxo-8(12),13-trans-prostadienoate in 15 ml of benzene there is added 2 ml of fresh 4'-ethoxy-5',6'-dihydro-2H-pyran and 0.06 ml of phosphorous oxychloride and the flask heated to about 30°C for 1 ½ hr. Next, the solution is cooled to room temperature and diluted with 50 ml of ether, washed with 50% brine and saturated brine until the solution is neutral. Next, the organic phase is dried over anhydrous MgSO₄, filtered and freed of solvent under reduced pressure. Then the residue is purified by column chromatography on neutral silica using a benzene-ethyl acetate gradient to yield methyl-15(S)-(5',6'-dihydro-2H-pyran-4'-yloxy)-9-oxo-8(12),13-trans-prostadienoate.

EXAMPLE 9

Following the procedure of Example 8, but replacing methyl-15(S)-hydroxy-9-oxo-8(12),13-trans-prostadienoic acid with:

15(S)-hydroxy-9-oxo-5-cis,10,13-trans-prostatrienoic acid,

15(R)-hydroxy-9-oxo-5-cis,10,13-trans-prostatrienoic acid,

15(R)-hydroxy-9-oxo-10,13-trans-prostadienoic acid,

15(S),19-dihydroxy-9-oxo-10,13-trans-prostadienoic acid, ethyl-15(S)-19-dihydroxy-9-oxo-10,13-trans-prostadienoate, the following ethers are formed:

15(S)-(5',6'-dihydro-2H-pyran-4'-yloxy)-9-oxo-5-cis,10,13-trans-prostatrienoic acid, 15(R)-(5',6'-dihydro-2H-pyran-4'-yloxy)-9-oxo-5-cis,10,13-trans-prostatrienoic acid, 15(R)-(5',6'-dihydro-2H-pyran-4'-yloxy)-9-oxo-10,13-trans-prostadienoic acid, 15(S),19-bis(5',6'-dihydro-2H-pyran-4'-yloxy)-9-oxo-10,13-trans-prostadienoic acid, and, ethyl-15(S)-19-bis(5',6'-dihydro-2H-pyran-4'-yloxy)-9-oxo-10,13-trans-prostadienoate.

EXAMPLE 10

To 450 mg of 9-formylamino,11α,15(S)-dihydroxy-13-trans-prostenonitrile, having the following structure, Formula 5

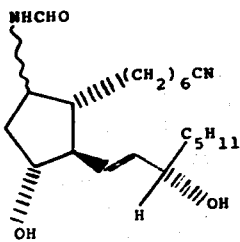

Formula 5 are prepared according to J. Am. Chem. Soc., Vol 90, pages 3245 to 3248, 1968, in 10 ml of methylene chloride there is added 1.5 ml of distilled 4'-methoxy-5',6'-dihydro-2H-pyran and 5 mg of anhydrous p-toluenesulfonic acid and the mixture stirred for about 20 minutes at room temperature. After quenching the reaction with a few drops of pyridine and ether, the product is obtained by evaporation of the solvent in vacuo. Next, the product 9-formamido,11α,15(S)-bis(5',6'-dihydro-2H-pyran-4'-yloxy)-13-trans-prostenonitrile, of the following structure, Formula 6:

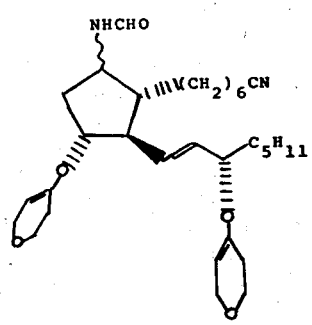

Formula 6 is converted to the amino acid by the hydrolysis of the cyano group and deformylation with 4 chemical equivalents of KOH in MeOH—H₂O at 110°–125°C for 16–17 hrs in a sealed borosilicate tube. The amino product is isolated by extraction with dichloromethane after addition of water and excess solid carbon dioxide. The amino group is next converted to its N-bromo derivative with N-bromosuccinimide in dichloromethane; then, base catalyzed dehydrobromination, using alkoxides or amidines hydrolysis in dilute aqueous acetic acid and chromatography on silica to yield 11α,15(S)-bis(5',6'-dihydro-2H-pyran-4'-yloxy)-9-oxo-13-trans-prostenoic acid.

EXAMPLE 11

Following the procedure of Example 12, but replacing 9-formamido-11α,15(S)-dihydroxy-13-trans-prostenonitrile with:

racemic 9-formamido-11β,15(S)-dihydroxy-13-trans-prostenonitrile, racemic 9-formamido-11α,15(R)-dihydroxy-13-trans-prostenonitrile, racemic 9-formamido-11β,15(R)-dihydroxy-13-trans-prostenonitrile, and, enantio 9-formamido-11β,15(R)-dihydroxy-13-trans-prostenonitrile, also prepared by the method outlined in J. Am. Chem. Soc., Vol 90, pages 3245 to 3248, 1968; the following ethers are formed:

racemic 11β,15(S)-bis(5',6'-dihydro-2H-pyran-4'-yloxy)-9-oxo-13-trans-prostenoic acid, racemic 11α,15(R)-bis(5',6'-dihydro-2H-pyran-4'-yloxy)-9-oxo-13-trans-prostenoic acid, racemic 11β,15(R)-bis(5',6'-dihydro-2H-pyran-4'-yloxy)-9-oxo-13-trans-prostenoic acid, and, enantio 11β,15(R)-bis(5',6'-dihydro-2H-pyran-4'-yloxy)-9-oxo-13-trans-prostenoic acid.

EXAMPLE 12

The compounds, 9β-hydroxy,11α,15(S)-bis(5',6'-dihydro-2H-pyran-4'-yloxy)-13-trans-prostenoic and 9β-hydroxy,11α,15(S)-bis(5',6'-dihydro-2H-pyran-4'-yloxy)-13-trans-prostenoic acid are prepared by the reduction of the corresponding 11α,15(S)-bis(5',6'-dihydro-2H-pyran-4'-yloxy)-9-oxo-13-trans-prostenoic acid using $NaB(R)_nH_{4-n}$ wherein R is a lower alkyl of 1 to 4 and n is 0 to 4, in an inert organic solvent at 0°C to 30°C for 15 minutes to 1 hour to give the set forth prostaglandin ether compounds. For example, the reduction is performed with sodium borohydride in methanol at 0°C for 30 minutes followed by chromatographic separation to give the prostaglandin ethers.

EXAMPLES 13 to 16

The α-homo analogues of 11,15-bis(5',6'-dihydro-2H-pyran-4'-yloxy)-5-cis,13-trans-prostadienoic acid, (11,15-bis-dihydro-pyran of $PGF_{2\alpha}$); of 11,15-bis(-5',6'-dihydro-2H-pyran-4'-yloxy)-9-oxo-5-cis,13-trans-prostadienoic acid, (11,15-bis-dihydro-pyran of $PGE_2$); of 11,15-bis(5',6'-dihydro-2H-pyran-4'-yloxy)-13-trans-prostenoic acid, (11,15-bis-dihydro-pyran of $PGF_{1\alpha}$); and of 11,15-bis(dihydro-2H-pyran-4'-yloxy)-9-oxo-13-trans-prostenoic acid (11,15-bis-dihydro-pyran of $PGE_1$) are prepared according to the procedure as set forth in Examples 1 to 4 inclusive, and all reaction conditions and reagents are as described except that 5-triphenylphosphionio hexanoic acid $\phi_3P^+CH_2(CH_2)_4CO_2H$ $Br^-$ ($\phi$=phenyl) is used in place of $\phi_3P^+CH_2(CH_2)_3 CO_2$ $Br^-$ to give the desired compounds.

EXAMPLE 17

In this preparation, the 15-epimer of the hemi-acetal employed in Examples 13 to 16 inclusive, also prepared by the method as set forth in *J. Am. Chem. Soc.*, Vol 92, pages 2586 to 2587, 1970, and the reference cited therein, and shown here as Formula 7 as follows:

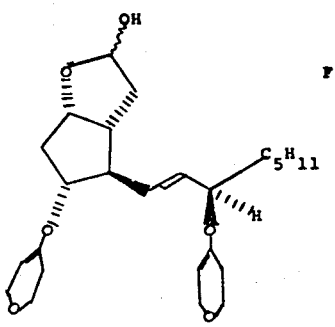

Formula 7 in either this form, or as the enantiomer is reacted with $\phi_3P^+CH_2(CH_2)_3CO_2H$ $Br^-$ according to Examples 13 to 16 to produce the following prostaglandin ethers:

11α,15(R)-bis(5',6'-dihydro-2H-pyran-4'-yloxy)-9α-hydroxy-5-cis,13-trans-prostadienoic acid, enantio 11α,15(R)-bis(5',6'-dihydro-2H-pyran-4'-yloxy)-9α-hydroxy-5-cis,13-trans-prostadienoic acid, 11α,15(R)-bis(5',6'-dihydro-2H-pyran-4'-yloxy)-9-oxo-5-cis, 13-trans-prostadienoic acid, and, enantio 11α,15(R)-bis(5',6'-dihydro-2H-pyran-4'-yloxy)-9-oxo-5-cis,13-trans-prostadienoic acid.

EXAMPLE 18

Examples of additional 5',6'-dihydro-2H-pyran-4'-yl prostaglandin ethers that are prepared according to the present disclosure and are suitable for the present purpose are:

11α,15(S)-bis(5',6'-dihydro-2H-pyran-4'-yloxy)-9-oxo-13-trans-prostenoic acid,

11α,15(S)-bis(5',6'-dihydro-2H-pyran-4'-yloxy)-9-oxo-5-cis, 13-trans-prostadienoic acid, isopropyl 11α,15(S)-bis(5',6'-dihydro-2H-pyran-4'-yloxy)-9-oxo-5-cis,13-trans-prostadienoate, 11α,15(S)-bis(5',6'-dihydro-2H-pyran-4'-yloxy)-9-oxo-5-cis, 13-trans,17-cis-prostatrienoic acid, 11α,15(S)-bis(5',6'-dihydro-2H-pyran-4'-yloxy)-9-oxo-13-trans-8-iso-prostenoic acid, 11α,15(S)-bis(5',6'-dihydro-2H-pyran-4'-yloxy)-9-oxo-13-trans-ω-homo-prostenoic acid, 9α,11α,15(S)-tris(5',6'-dihydro-2H-pyran-4'-yloxy)-5-cis, 13-trans-prostadienoic, butyl 9α,11α,15(R)-tris(5',6'-dihydro-2H-pyran-4'-yloxy)-5-cis,13-trans-prostadienoate, 9α,11α,15(S)-tris(5',6'-dihydro-2H-pyran-4'-yloxy)-5-cis, 13-trans,17-cis-prostatrienoic acid, ethyl-15(S)-5',6'-dihydro-2H-pyran-4'-yloxy-9-oxo-10,13-trans-prostadienoate, 15(S)-5',6'-dihydro-2H-pyran-4'-yloxy-9-oxo-5-cis,10,13-trans-prostatrienoic acid, and, methyl-15(S)-19-bis-(5',6'-dihydro-2H-pyran-4'-yloxy)-9-oxo-10,13,trans-prostadienoate.

DESCRIPTION OF INVENTIVE APPLICATIONS

The novel prostaglandin ethers of the invention as embraced by Formula 1 possess valuable and useful properties. The prostaglandin ethers are inventively characterized by their ability to serve as a source of the parent prostaglandin following the controlled metabolic hydrolysis of the prostaglandin from 5',6'-dihydro-2H-pyran-4'-yl moiety. For example, prostaglandin ethers with a $C_1$ keto group and one or both of the $C_3$ and $R_4$ positions substituted with a 5',6'-dihydro-2H-pyran-4'-yl group on, for example, in vivo separation of the latter group with formation of hydroxyl groups make available prostaglandins that possess valuable pharmacoligical properties, including the ability to lower blood pressure and relieve asthma and nasal congestion. These formed parent prostaglandins are useful for the management of hypertension in avians, mammals, including humans, farm animals and for scientific studies using laboratory animals. Also, following the separation of the 5',6'-dihydro-2H-pyran-4'-yl groups and with concomitant formation of hydroxyl groups in vivo, these will produce for example, 11α,15(S)-dihydroxy-9-oxo-5-cis,13-trans-prostadienoic acid; the latter compound when administered at the rate of 0.5 μg/min/kg intravenously, or 2 mg/2 hrs intravaginally, or 0.5 mg/2 hrs orally, is known to be effective in humans for the induction of labor. Representative prostaglandin ethers for obtaining prostaglandins that possess the set forth pharmacological properties include 11α,15(S)-bis(5',6'-dihydro-2H-pyran-4'-yloxy)-9-oxo-13-trans-prostenoic acid; 11α,15(S)-bis(5',6'-dihydro-2H-pyran-4'-yloxy)-9-oxo-5-cis,13-trans-prostadieonic acid; 11α,15(S)-bis(5',6'-dihydro-2H-pyran-4'-yloxy)-9-oxo-5-cis,13-trans,17-cis-prostatrienoic acid and the like.

The prostaglandin ethers of the invention as represented by Formula 1 and substituted at the $C_1$, $C_3$, and $R_4$ positions with a 5',6'-dihydro-2H-pyran-4'-yl group on separation of the latter groups, and with concomitant in vivo formation of hydroxyl groups at the $C_1$, $C_3$, and $R_4$ positions, will produce prostaglandins possessing smooth muscle stimulating activity, for example, 9α,11α,15(S)-trihydroxy-13-trans-prostenoic acid, 9α, 11α,15(S)-trihydroxy-5-cis,13-trans-prostadienoic acid, and the like, which latter compounds when administered intravenously (5 μg/kg/min) or intravaginally (25 mg/2 hrs) will induce labor in mammals, including humans. Exemplary of novel prostaglandin ethers that furnish the corresponding prostaglandins which latter prostaglandins possess smooth muscle acitivity are 9α,11α,15(S)-tris(5',6'-dihydro-2H-pyran-4'-yloxy)-13-trans-prostenoic acid; 9α,11α,15(S)-tris(5',6'-dihydro-2H-pyran-4'-yloxy)-5-cis,13-trans-prostadienoic acid; 9α,11α,15(S)-tris(5',-6'-dihydro-2h-pyran-4'-yloxy)-5-cis,13-trans,17-cis-prostatrienoic acid, and the like.

The prostaglandin ethers of the invention that supply in vivo a physiologically active prostaglandin characterized by a $C_1$ keto group and (1) a $C_3$ and $R_4$ hydroxyl group according to Formula 1 or (2) a $C_i$, $C_3$ and $R_4$ hydroxyl group according to Formula 1 are physiologically useful for not only inducing labor but also menses and for the termination of pregnancy. Representative of prostaglandin ethers that can serve as an in vivo source of physiologically active prostaglandins when administered for example, intravenously, at the rate of 0.1 to 1.0 μg/min, calculated as freed prostaglandins are ethers such as 9α,11α,15(S)-tris(5',6'-dihydro-2H-pyran-4'-yloxy)-13-trans-prostenoic acid; 9α,11α,15(S)-tris(5',6'-dihydro-2H-pyran-4'-yloxy)-5-cis,13-trans-prostadienoic acid; 9α,11α,15(S)-tris(5',-6'-dihydro-2H-pyran-4'-yloxy)-5-cis,13-trans,17-cis-prostatrienoic acid; 11α,15(S)-bis-9-oxo-5-cis,13-trans-prostadienoic acid; 11α,15(S)-bis(5',6'-dihydro-2H-pyran-4'-yloxy)-9-oxo-13-trans-prostenoic acid; and the like.

The novel prostaglandin ethers can be used for the relief of asthma, nasal congestion and inhibition of lipolysis by supplying from prostaglandin ethers of Formula 1 and substituted with a $C_1$ keto and a $R_4$ 5',6'-dihydro-2H-pyran group or a prostaglandin ether substituted with a $C_1$ keto and at $C_3$ and $R_4$ with a 5',6'-dihydro-2H-pyran group the corresponding parent prostaglandins possessing the desired therapeutic utility. Exemplary of prostaglandin ethers of the invention for producing the corresponding prostaglandins include 15(S)-(5',6'-dihydro-2H-pyran-4'-yloxy)-9-oxo-10,13-trans-prostadienoic acid; 15(S)-(5',6'-dihydro-2H-pyran-4'-yloxy)-5-cis,10,13-trans-prostatrienoic acid; 11α,15(S)-bis(5',6'-dihydro-2H-pyran-4'-yloxy)-9-oxo-5-cis,13-trans-prostadienoic acid; and the like.

The prostaglandin ethers of Formula 1 of the invention substituted with a $C_1$ keto group and additionally with a $R_4$ or a $C_3$ and $R_4$ 5',6'-dihydro-2H-pyran-4'-yloxy group are useful for the management of gastric secretions. These prostaglandin ethers release the natural anti-secretory prostaglandin in the stomach upon the acidic hydrolysis of the prostaglandin ether to free the prostaglandin group of the prostaglandin ether from the affixed pyranyloxy moiety. The prostaglandin ether's ability to release free prostaglandin under gastric-like environmental conditions is demonstrated by standard in vitro experiments using an artificial gastric juice consisting essentially of mineral acid, hydrochloric, at varying pH from 1 to 4.5 at 37°C. For example, 11α,15(S)-bis(5',6'-dihydro-2H-pyran-4'-yloxy)-9-oxo-5-cis,13-trans prostadienoic acid releases active 11α,15(S)-dihydroxy-9-oxo-5-cis,13-trans-prostadienoic acid at pH 2 to 4 and at 37°C. The immediately described prostaglandin ethers are therapeutically indicated for regulating gastric secretions, that is, hyperacidity, because as the pH of the stomach reaches 4.5 to 5 the hydrolysis of the prostaglandin ether is essentially decreased, and, as the prostaglandin ether passes from the stomach into the intestine, the unwanted increased intestine peristalsis or increased intestinal motility with the accompanying bowel actions and diarrhea following administration of the natural form of the prostaglandins in the intestine are essentially absent for the prostaglandin ethers of the invention.

The prostaglandin ether's ability to release prostaglandin is determined by standard laboratory techniques, for example, by adding small amounts, 10 micrograms, 50 micrograms, etc., of the prostaglandin ether to hydrogen ion environments at varying pH and then detecting the presence of freed prostaglandin by conventional muscle bioassay. For example, the addition of 9α,11α,15(S)-tris (5',6'-dihydro-2H-pyran-4'-yloxy)-5-cis,13-trans-prostadienoic acid, and for racemic 9α,11α,15(S)-tris-(5',6'-dihydro-2H-pyran-4'-yloxy)-5-cis, 13-trans-prostadienoic acid to a hydrogen ion environment, hydrochloric acid, indicated by bioassay for example contraction of isolated rat uterine or gerbil colon strips, that from about pH 1 to 4.5, controlled hydrolysis of the ether linkage occurs to release determinable quantities of the corresponding prostaglandin.

The prostaglandin ethers of the invention possess desirable partiton coefficients that are seemingly not present in prior art prostaglandins between aqueous and lipid phases and they are therefore adaptable for administering for their physiological effects from drug delivery systems, such as intrauterine contraception devices, skin drug delivery bandages and the like, manufactured from naturally occurring and synthetic polymeric materials. This novel and useful property of the prostaglandin ethers make possible their diffusion at measurable controlled rates through polymeric materials such as polyvinylchloride, polyisoprene, polybutadiene, polyethylene, ethylene-vinyl acetate, collagen, polydimethylsiloxanes, hydrophilic hydrogels of esters of acrylic and methacrylic acids, polyvinyl acetates, propylenevinyl acetate copolymers, and the like.

The novel prostaglandin ethers of the invention can be used by the pharmaceutical and the veterinary arts in a variety of pharmaceutical preparations or veterinary perparations. In these preparations, the new compounds are administrable in the form of tablets, pills, powders, capsules, injectables, solutions, suppositories, emulsions, dispersions, food premix and in other suitable forms. The pharamaceutical or veterinary perparation which contains the compound is conveniently admixed with a nontoxic pharmaceutical organic carrier or a non-toxic pharmaceutical inorganic carrier. Typical of pharmaceutically acceptable carriers, are for example, water, gelatine, lactose, starches, magnesium stearate, talc, vegetable oils, polyalkylene glycols, petroleum jelly and other conventionally employed pharmaceutically acceptable carriers. The pharmaceutical preparation may also contain non-toxic auxiliary substances such as emulsifying, preserving, wetting agents and the like, as for example, sorbitan monolaruate, triethanolamine oleate, polyoxyethylene sorbitan monopalmityl, dioctyl sodium sulfosuccinate, and the like.

Exemplary of a typical method for preparing a tablet containing the active ingredient is to first suitably comminute the active ingredient with a diluent such as starch, sucrose, kaolin or the like to form a powder mixture. Next, the just prepared mixture can be granulated by wetting with a non-toxic binder such as a solution of gelatin, acacia mucilage, corn syrup and the like and after mixing the composition is screened to any predetermined particle sieve size. As an alternative, if preferred to granulation, the just prepared mixture can be slugged through conventional tablet machines and the slugs comminuted before the fabrication of the tablets. The freshly prepared tablets can be coated or they can be left uncoated. Representative of suitable coatings are the non-toxic coatings including shellac, methylcellulose, carnauba wax, styrenemaleic acid copolymers and the like. For oral administration, compressed tablets containing 0.01 milligram, 5 milligrams, 25 milligrams, 50 milligrams, etc., up to 1500 milligrams, and the like, are manufactured in the light of the above disclosure and by art known fabrication techniques well known to the art and set forth in *Remington's Pharmaceutical Science*, Chapter 39, Mack Publishing Co., 1965. The pharmaceutical manufacture of a formulation is shown in Example 19:

EXAMPLE 19

|  | Per tablet, mg |
| --- | --- |
| Prostaglandin ether | 2.0 |
| Corn starch | 15.0 |
| Corn starch paste | 4.5 |
| Lactose | 82.0 |
| Calcium stearate | 2.0 |
| Dicalcium phosphate | 50.0 |

To formulate the tablet, uniformly blend the prostaglandin ether, corn starch, lactose and dicalcium phosphate in a V-blender until all the ingredients are uniformly mixed together. Next, the corn starch is prepared as a 10% aqueous paste and it is blended with the uniform mixture until a uniform mixture is obtained. Then, the wet granulation is passed through a standard eight mesh screen, dried and rescreened with a twelve mesh screen. The dry granules are next blended with calcium stearate and compressed into tablets. Other tablets containing 0.05, 0.25, 1.0, 5.0, 10.0 mgs, etc. are prepared in a like fashion.

The manufacture of capsules containing 0.1 milligram to 500 milligrams for oral use consists essentially of mixing the active compound with a non-toxic carrier and enclosing the mixture in a gelatin sheath. The capsules can be in the art known soft form of a capsule made by enclosing the compound in intimate dispersion within an edible oil or the capsule can be a hard capsule consisting essentially of the novel compound mixed with a non-toxic solid such as talc, calcium stearate, calcium carbonate or the like. Exemplary of a typical use employing capsules containing 25 mg of 11α,15(S)-bis(5',6'-dihydro-2H-pyran-4'-yloxy)-9-oxo-13-trans-prostenoic acid is therapeutically indicated per diem for inhibiting gastric secretions with lesser amounts indicated as the pH of the stomach of about 4 to 5.

The daily dose administered for the compounds will of course vary with the particular novel prostaglandin ether employed because of the varying potency of the compounds, the chosen route of administration and the size of the recipient. The dosage administered is not subject to definite bounds, but it will usually be an effective amount or the equivalent on a molar basis, of the pharmacologically active free acid form produced upon the metabolic release of the prostaglandin to achieve the biological function of the prostaglandin. Representative of a typical method for administering the 5',6'-dihydro-2H-pyran-4'-yloxy prostaglandin ethers of the invention is by the injectable-type administration route. By this route, a sterile solution containing the compound is administered intravenously or subcutaneously at the rate of 0.01 microgram to 0.50 microgram per kilogram of body weight per minute by means of an infusion pump at the rate of 10 to 15 milliters per hour. For example, the compound 9α,11α,15(S)-tris-(5',6'-dihydro-2H-pyran-4'-yloxy)-13-trans-prostenoic acid can be administered by this route for producing stimulation of smooth muscles; 11α,15(S)-bis(5',6'-dihydro-2H-pyran-4'-yloxy)-9-oxo-13-trans-prostenoic acid can be administered by this route for regulating the acidic gastric concentration and the volume of gastric secretion. Another typical method for administering the prostaglandin ether is by the oral route. By the oral route, 10 $\mu$g to 75 $\mu$g per kg of recipient per day is administered to evoke the desired effects. Thus, for a typical 75 kg recipient the daily dose is about 750 $\mu$g to 4125 $\mu$g. The compound is administered by the injectable route in a form suited for injection, such as mixed with sterile physiological saline, or in aqueous solutions having incorporated therein an agent that delays absorption such as aluminum monostearate and the like.

Suitable topical preparations containing the novel prostaglandin ethers can easily be prepared by, for example, mixing 500 mg of the 5',6'-dihydro-2H-pyran-4'-yloxy prostaglandin with 15 g of cetyl alcohol, 1 g of sodium lauryl sulfate, 40 g of liquid silicone D.C. 200 sold by Dow Corning Co., Midland, Michigan, 43 g of sterile water, 0.25 g of methylparaben and 0.15 g of propylparaben and warming the mixture with constant stirring to about 75°C and then permitting the preparation to congeal. The preparation containing the prostaglandin ether can be readily applied to the skin by inunction or it can be applied topically by dispensing the preparation from a conventional surgical gauze dispenser, and the like. The prostaglandin ethers penetrate the outermost layer of the skin, the stratum corneum, more readily than unetherified prostaglandins and as such the prostaglandins' ethers lend themselves to topical administration. Suitable procedures for preparing topical applications are set forth in *Remington's Pharmaceutical Science*, Chapter 37, as cited supra.

The compounds of this invention can also be conveniently administered in aerosol dosage form. An aerosol form can be described as a self-contained sprayable product in which the propellant force is supplied by a liquified gas. For administering a self-propelled dosage form of about 1 mg to 500 mg that is used about 3 or 4 times daily for inhalation therapy, the bronchodialator 11α,15(S)-bis(5',6'-dihydro-2H-pyran-4 -yloxy)-9-oxo-5-cis,13-trans prostadienoic acid is suspended in an inert non-toxic propellant in a commercially available compressed-gas aerosol container. Suitable propellants include trichloromonofluoromethane, dichlorodifluoromethane, dichlorodifluoroethane, monochlorodifluoroethane and mixtures thereof. The inert gas can also be mixed with non-toxic cosolvents such as ethanol, if desired, to produce the aerosol form. If the compound is administered by oral inhalation employing conventional nebulizers, it is convenient to dilute in an aqueous solution about 1 part of the novel prostaglandin with about 1,000 to 10,000 parts of solution, for administering 3 to 4 times per day.

For administering to valuable domestic household, sport or farm animals such as sheep, goats, cattle, etc., or for administering to laboratory animals for scientific studies, the compound is prepared in the form of a food premix, such as mixing with dried fish meal, oatmeal, straw, hay, ground corn, mash, and the like, and then the prepared premix is added to the regular feed, thereby administering the compound to the domestic or laboratory animal in the form of feed.

In laboratory studies for determining the applicability of the prostaglandin ethers to mammals, including humans, avians, and valuable animals, the studies are carried out with rats, mice, etc. For example, in laboratory gastic anit-secretory studies with standard white laboratory rats, the compound 9α,11α,15(S)-tris(5',6'-dihydro-2H-pyran-4'-yloxy)-13-trans-prostenoic acid is administered orally by perfusion in saline at the rate of 0.1 microgram to 1.0 microgram per minute across the mucosal surface of the stomach to essentially inhibit release of titratable acidity.

The above examples and disclosure are set forth merely for illustrating the mode and the manner of the invention and various modifications and embodiments can be made by those skilled in the art in the light of the invention without departing from the spirit of the invention.

We claim:

1. A pharmaceutical preparation comprising 0.01 milligrams to 1500 milligrams of a member selected from the group consisting of a compound of the formula:

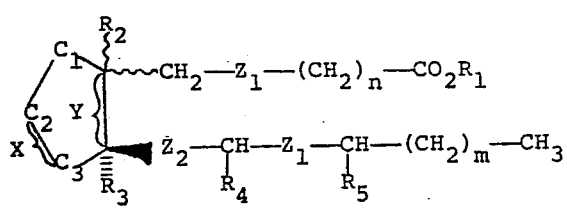

wherein $R_1$ is selected from the group consisting of hydrogen and lower alkyl; $R_2$ and $R_3$ are both hydrogen when Y is a single bond and $R_2$ and $R_3$ are both absent when Y is a double bond; $R_4$ is

$R_5$ is a member selected from the group consisting of hydrogen and

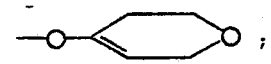

$C_1$ is a member selected from the group consisting of $>C=O$,

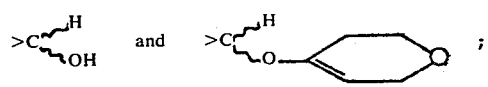

$C_2$ is a member selected from the group consisting of

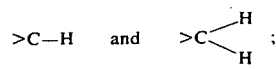

$C_3$ is a member selected from the group consisting of $>C-H$,

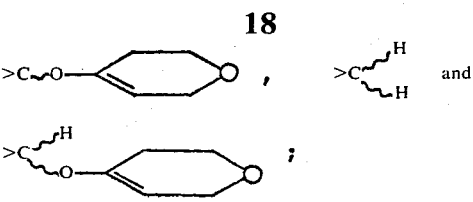

$Z_1$ is a member selected from the group consisting of cis and trans $-CH=CH-$ and $-CH_2CH_2-$; $Z_2$ is a member selected from the group consisting of trans $-CH=CH-$ and $-CH_2CH_2-$; X is selected from the group consisting of a single bond and double bond and X is a double bond when $C_2$ and $C_3$ are substituted with hydrogen and wherein n is 1 to 5 and m is 0 to 5; the diastereomers and non-toxic salts thereof admixed with a pharmaceutically acceptable carrier.

2. An aerosol dosage formulation comprising 0.01 milligrams to 1500 milligrams of a member selected from the group consisting of a compound of the formula:

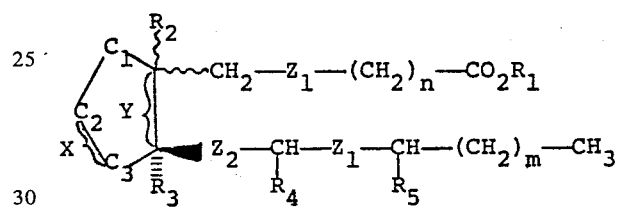

wherein $R_1$ is selected from the group consisting of hydrogen and lower alkyl; $R_2$ and $R_3$ are both hydrogen when Y is a single bond and $R_2$ and $R_3$ are both absent when Y is a double bond; $R_4$ is

$R_5$ is a member selected from the group consisting of hydrogen and

$C_1$ is a member selected from the group consisting of $>C=O$,

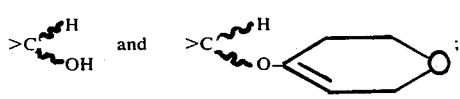

$C_2$ is a member selected from the group consisting of

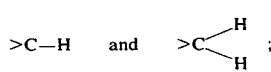

$C_3$ is a member selected from the group consisting of $>C-H$,

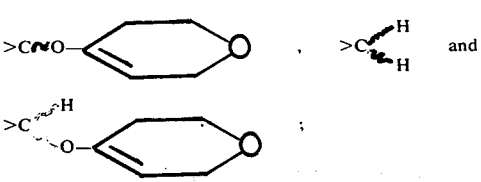

$Z_1$ is a member selected from the group consisting of cis and trans $-CH=CH-$ and $-CH_2CH_2-$; $Z_2$ is a member selected from the group consisting of trans $-CH=CH-$ and $-CH_2CH_2-$; X is selected from the group consisting of a single bond and double bond and X is a double bond when $C_2$ and $C_3$ are substituted with hydrogen; and wherein $n$ is 1 to 5 and $m$ is 0 to 5; the diastereomers and non-toxic salts thereof admixed with a pharmaceutically acceptable propellant carrier.

* * * * *